(12) United States Patent
Kawakami et al.

(10) Patent No.: US 12,468,214 B2
(45) Date of Patent: Nov. 11, 2025

(54) PROJECTOR

(71) Applicant: SEIKO EPSON CORPORATION, Tokyo (JP)

(72) Inventors: Shotaro Kawakami, Matsumoto (JP); Satoshi Tamai, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 432 days.

(21) Appl. No.: 18/160,352

(22) Filed: Jan. 27, 2023

(65) Prior Publication Data

US 2023/0236483 A1 Jul. 27, 2023

(30) Foreign Application Priority Data

Jan. 27, 2022 (JP) .................. 2022-010739

(51) Int. Cl.
*G03B 21/14* (2006.01)
*G03B 29/00* (2021.01)
*H04N 9/31* (2006.01)
*H04R 1/02* (2006.01)

(52) U.S. Cl.
CPC .......... *G03B 21/145* (2013.01); *G03B 29/00* (2013.01); *H04R 1/025* (2013.01); *H04R 1/028* (2013.01); *H04R 2499/15* (2013.01)

(58) Field of Classification Search
CPC ..... G03B 21/16; G03B 21/145; H04N 9/3141
USPC .......................................................... 353/119
See application file for complete search history.

(56) References Cited

U.S. PATENT DOCUMENTS

2019/0166416 A1   5/2019   Taguchi et al.
2022/0303670 A1*  9/2022   Otsuki ..................... H04R 1/24

FOREIGN PATENT DOCUMENTS

| CN | 112153523 A | 12/2020 |
| JP | 2008-139770 A | 6/2008 |
| JP | 2012-215748 A | 11/2012 |
| JP | 2019-101169 A | 6/2019 |

* cited by examiner

*Primary Examiner* — Ryan D Howard
(74) *Attorney, Agent, or Firm* — Dority & Manning, P.A.

(57) ABSTRACT

A projector includes an outer housing, a single inner housing housed in the outer housing and including a first container and a second container, the second container housing a functional element, and a loudspeaker housed in the first container and including a frame, and the first container has a wall section extending along the frame.

10 Claims, 11 Drawing Sheets

PROJECTOR

The present application is based on, and claims priority from JP Application Serial Number 2022-010739, filed Jan. 27, 2022, the disclosure of which is hereby incorporated by reference herein in its entirety.

BACKGROUND

1. Technical Field

The present disclosure relates to a projector.

2. Related Art

In related art, a projector that modulates in accordance with image information a luminous flux outputted from a light source and projects the modulated luminous flux includes a built-in loudspeaker that outputs audio according to the projected image. For example, in the projector described in JP-A-2008-139770, the loudspeaker encapsulated in an enclosure is fixed to the interior of an exterior housing that constitutes the projector.

Since encapsulating the loudspeaker in the enclosure can prevent low-frequency sound from the front side of the loudspeaker and low-frequency sound from the rear side of the loudspeaker, which are opposite from each other in terms of phase, from canceling each other, whereby the quality and pressure of the sound outputted from the projector can be improved.

Encapsulating the loudspeaker in the enclosure to improve the quality and pressure of the sound from the projector increases the number of parts, resulting in problems of increases in cost and assembly man-hours.

SUMMARY

A projector according to an aspect of the present application includes an outer housing, a single inner housing housed in the outer housing and including a first container and a second container that houses a functional element, and a loudspeaker housed in the first container and including a frame, and the first container has a wall section extending along the frame.

A projector according to another aspect of the present application includes an outer housing, a cooler housed in the outer housing and including a first container and a refrigerant passage channel through which a refrigerant flows, and a loudspeaker housed in the first container and including a frame, and the first container has a wall section extending along the frame.

DESCRIPTION OF EXEMPLARY EMBODIMENTS

Embodiments of the present disclosure will be described below with reference to the drawings.

In the figures below, the scale of each member differs from the actual value to make the member large enough to be recognizable.

The figures each show axes X, Y, and Z as three axes perpendicular to one another. In the following description, the direction parallel to the axis X is also referred to as an "axis-X direction," the direction parallel to the axis Y is also referred to as an "axis-Y direction," and the direction parallel to the axis Z is also referred to as an "axis-Z direction. The side facing the tip of the arrow indicating each of the axes is also referred to as a "positive side", and the side opposite from the tip of the arrow is also referred to as a "negative side". The positive side of the axis-Z direction is also referred to as "upper", and the negative side of the axis-Z direction is also referred to as "lower". The plane containing the axes X and Y is also referred to a "plane XY", and the view of the plane XY in the direction of the axis Z is also referred to a "plan view" or "planar". A view of a cross section containing the axis Z in the direction perpendicular to the cross section is also referred to as a "cross-sectional view" or "cross-sectional".

1. First Embodiment

1.1. Overview of Projector

Figure 1:
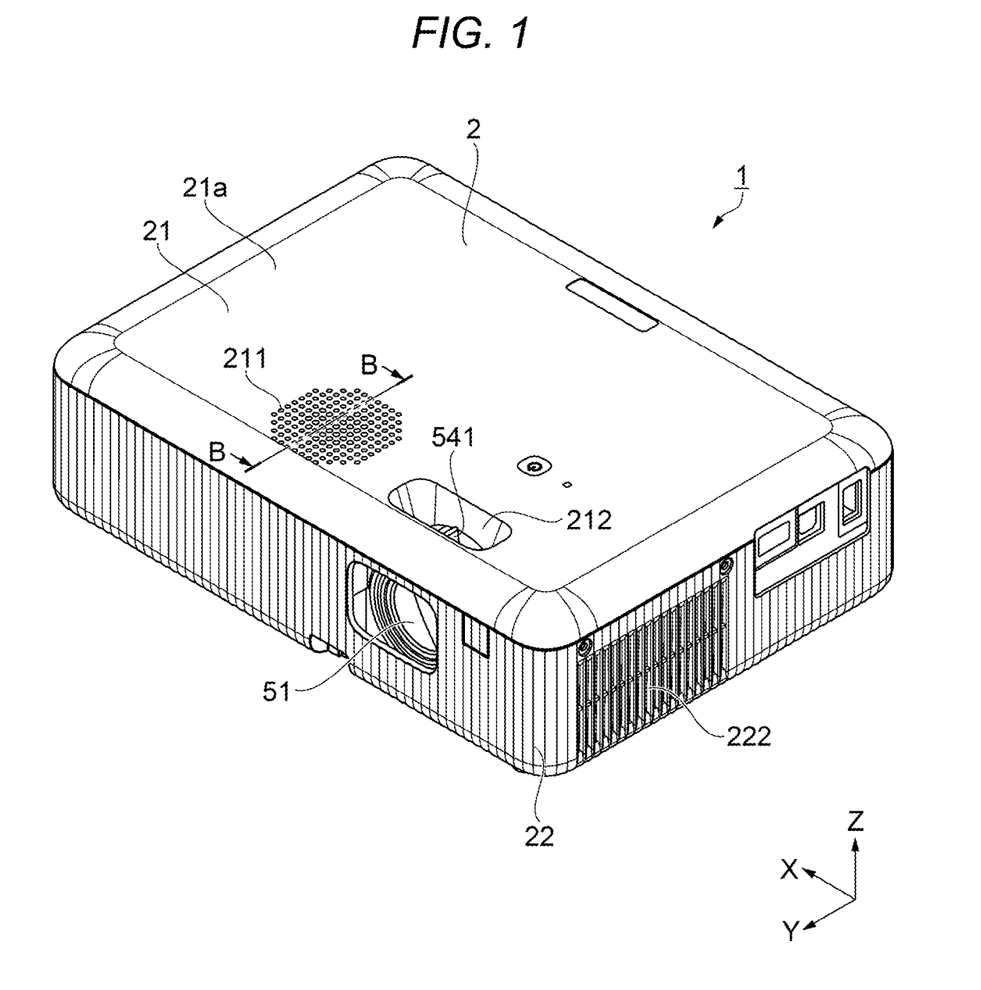
FIG. 1 is a perspective view showing the exterior appearance of a projector according to a first embodiment.
Figure 2:
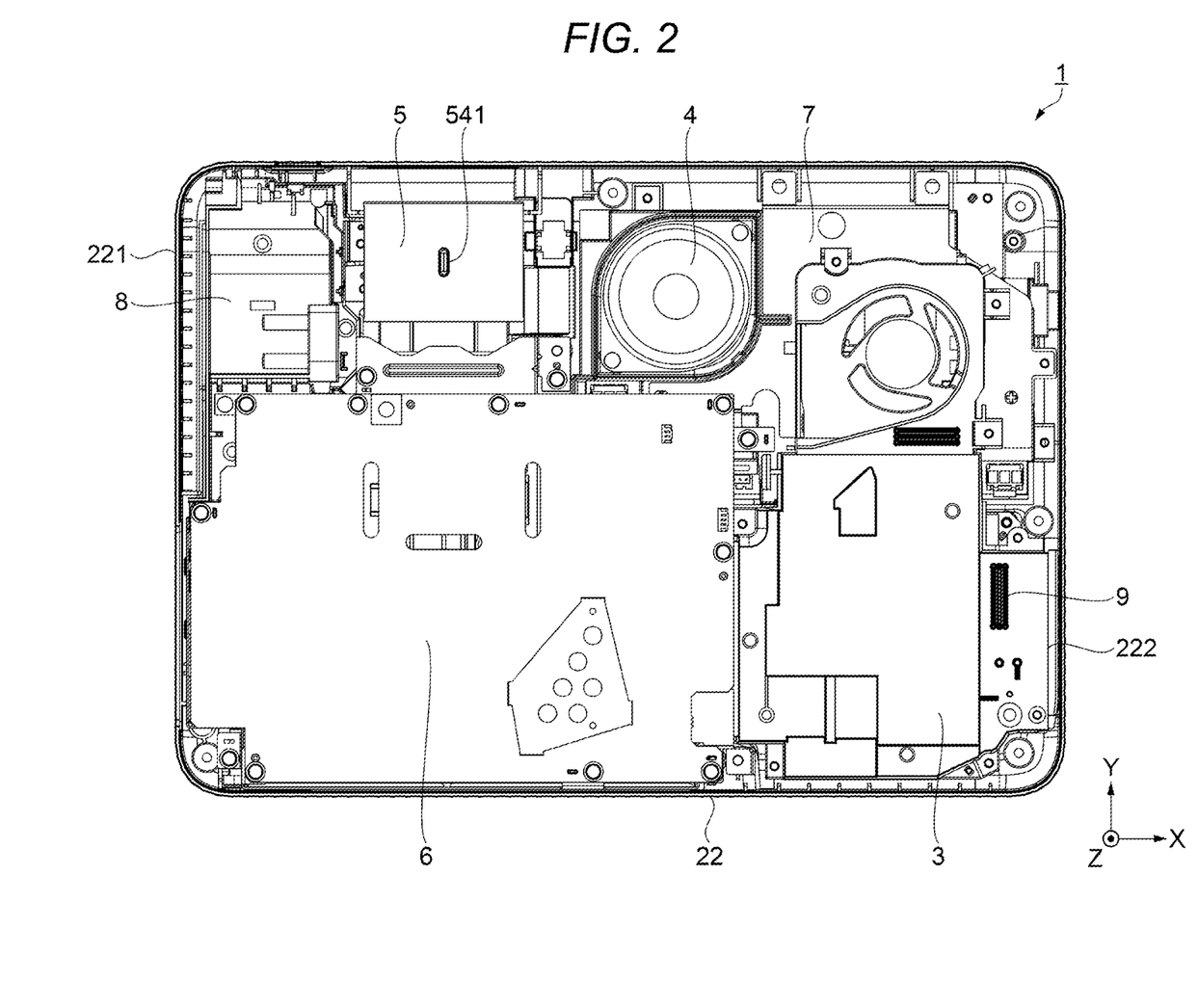
FIG. 2 is a plan view showing the interior of the projector shown in FIG. 1.

FIG. 1 is a perspective view showing the exterior appearance of a projector according to the present embodiment. FIG. 2 is a plan view showing the interior of the projector shown in FIG. 1.

A projector 1 includes an exterior housing 2 as an outer housing, a light source unit 3, a loudspeaker 4, an optical unit 5 including a projection lens 51, a primary substrate 6, a power source unit 7, an intake unit 8, and an exhaust unit 9, as shown in FIGS. 1 and 2.

The exterior housing 2 is made of synthetic resin and includes an upper case 21, a lower case 22, and other components, as shown in FIG. 1, which are assembled with screws, and the like.

The upper case 21 constitutes an upper portion of the exterior housing 2 as the outer housing, as shown in FIG. 1. An upper surface 21*a* of the upper case 21 is provided with a plurality of holes 211 in correspondence with the position where the loudspeaker 4 is disposed. An opening 212 is formed in the upper surface 21*a* of the upper case 21, and the opening 212 exposes a lever 541 for adjusting the focal point of the projection lens 51.

The lower case 22 constitutes a lower portion of the exterior housing 2. An intake port 221, via which outside air is taken in, is provided in the side surface, of the lower case 22, that faces the negative side of the axis X, as shown in FIG. 2. An exhaust port 222 is provided in the side surface, of the exterior housing 2, that faces the positive side of the axis X. A lower portion of the lower case 22 is provided with legs used when the projector 1 is installed on a desk or at any other location.

The primary substrate 6 has a CPU (central processing unit), a ROM (read only memory), a RAM (random access memory), and other components mounted thereon, and functions as a controller that controls the operation of the projector 1, an image signal processor, and an audio signal processor.

The optical unit 5 is so controlled by the controller that a luminous flux from the light source unit 3 is modulated by a light modulator that is not shown and projected via the projection lens 51. The optical unit 5 includes, as the light modulator, three liquid crystal light valves corresponding to red, green, and blue. The luminous flux from the light source unit 3 is modulated by the three liquid crystal light valves in accordance with color image signals, the modulated luminous fluxes are then combined with one another, and the combined luminous flux is enlarged and projected as a full-color image by the projection lens 51. The liquid crystal light valves can be transmissive or reflective liquid crystal light valves. The light modulator may instead be formed of DMDs (digital micromirror devices). The light modulator is not limited to a three-panel light modulator, and may be a single-plate light modulator.

1.2. Overview of Power Source Unit

The configuration of the power source unit 7 will next be described.

Figure 3:
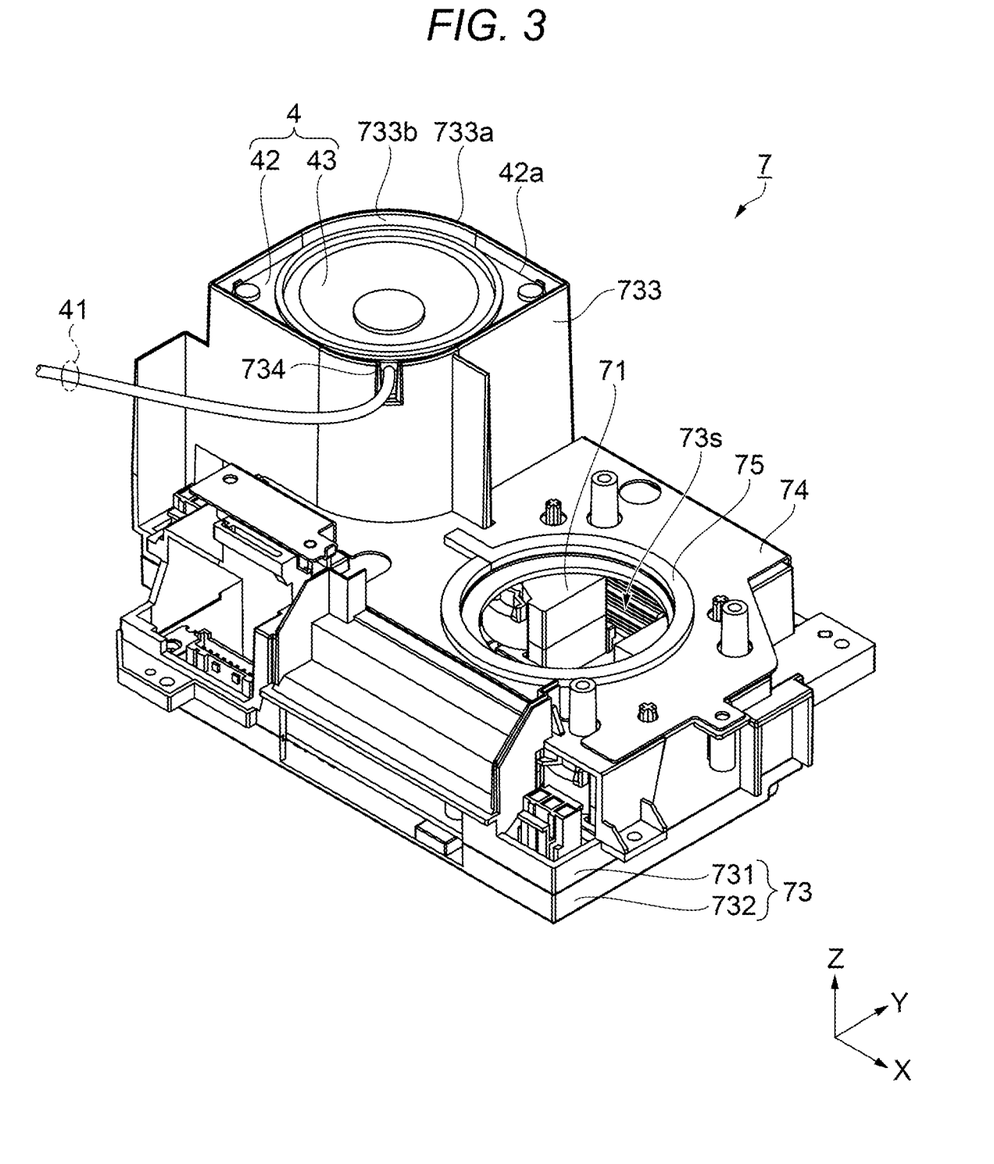
FIG. 3 is a perspective view of a power source unit in the first embodiment.
Figure 4:
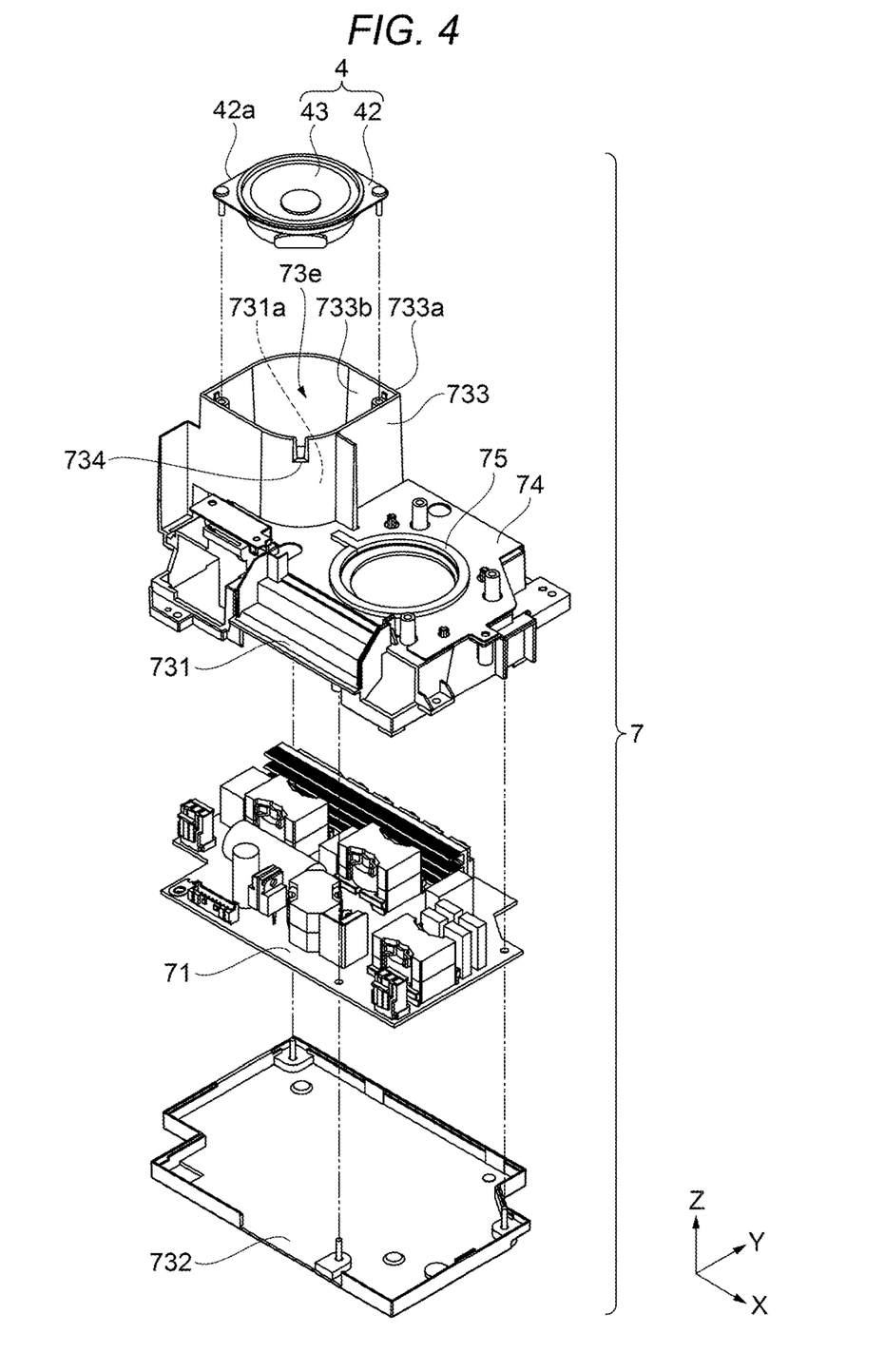
FIG. 4 is an exploded perspective view of the power source unit.

FIG. 3 is a perspective view showing the power source unit, and FIG. 4 is an exploded perspective view of the power source unit.

The power source unit 7 includes a power source circuit substrate 71 as a functional element, a power source housing 73 as an inner housing, an electromagnetic shield plate 74, an air introduction port 75, and the loudspeaker 4, as shown in FIG. 3.

The power source unit 7 rectifies electric power inputted via an inlet connector that is not shown, converts the rectified electric power into electric power having a variety of voltage values, and outputs the converted electric power to the primary substrate 6, the light source unit 3, the intake unit 8, and the exhaust unit 9.

The power source circuit substrate 71 includes circuit elements such as coils, transistors, and diodes, heat sinks, and other components mounted on the power source circuit substrate 71, as shown in FIG. 4.

The power source housing 73 is formed of an upper holder 731 and a lower holder 732 as a second container. The upper holder 731 and the lower holder 732 in combination creates a space 73s between the upper holder 731 and the lower holder 732, and the power source circuit substrate 71 is housed in the space 73s.

The upper holder 731 has a wall section 733 as a first container. The upper holder 731 is a molded part made of a resin material, and the wall section 733 is molded integrally with an upper surface 731a of the upper holder 731 to form part of the upper holder.

The loudspeaker 4 is attached to the wall section 733 in the vicinity of an opening edge 733a thereof, as shown in FIG. 3. The loudspeaker 4 includes a speaker cone 43 and a frame 42, which supports the speaker cone 43 in such a way that the speaker cone 43 can vibrate. The speaker cone 43 is an output section that outputs sound waves.

The wall section 733 is so formed that an inner wall 733b of the wall section 733 has a shape extending along an outer edge 42a of the frame 42 of the loudspeaker 4 to surround the loudspeaker 4. Disposing the loudspeaker 4 in the vicinity of the opening edge 733a of the wall section 733 therefore allows the loudspeaker 4 to close the opening edge 733a of the wall section 733, so that a space 73e facing the rear surface of the loudspeaker 4 is a sealed space.

Creating the space 73e facing the rear surface of the loudspeaker 4 as a sealed space can isolate the sound waves from the front side of the loudspeaker 4 and the sound waves from the rear side of the loudspeaker 4 from each other, and can therefore suppress a situation in which low-frequency sound from the front side and low-frequency sound from the rear side, which are opposite from each other in terms of phase, cancel each other out. The pressure of the sound from the loudspeaker 4 can thus be improved. The present applicant was able to ascertain that the projector 1, which employs the structure of the wall section 733 in the present embodiment, allows improvement in the sound pressure by about 3 dB when the loudspeaker 4 operated at a wattage of 5 W.

The space facing the rear surface of the loudspeaker 4 does not need to be a completely sealed space. There may be a gap formed between the loudspeaker 4 and the inner wall 733b of the wall section 733 and leading to the space facing the rear surface of the loudspeaker 4 as long as the sound waves from the front side of the loudspeaker 4 and the sound waves from the rear side of the loudspeaker 4 can be isolated from each other, so that the situation in which the low-frequency sound from the front side and the low-frequency sound from the rear side, which are opposite from each other in terms of phase, cancel each other out can be suppressed.

The opening edge 733a of the wall section 733 is provided with a cutout 734. A cable 41 coupled to the loudspeaker 4 is drawn out of the power source housing 73 via the cutout 734, as shown in FIG. 3. The cable 41 is coupled to the primary substrate 6 and transmits an acousto-electric signal outputted from the audio signal processor to the loudspeaker 4.

A sirocco fan that is not shown is disposed at the air introduction port 75 to introduce cooling air from the space outside the power source housing 73 into the space 73s via the air introduction port 75.

Figure 5:
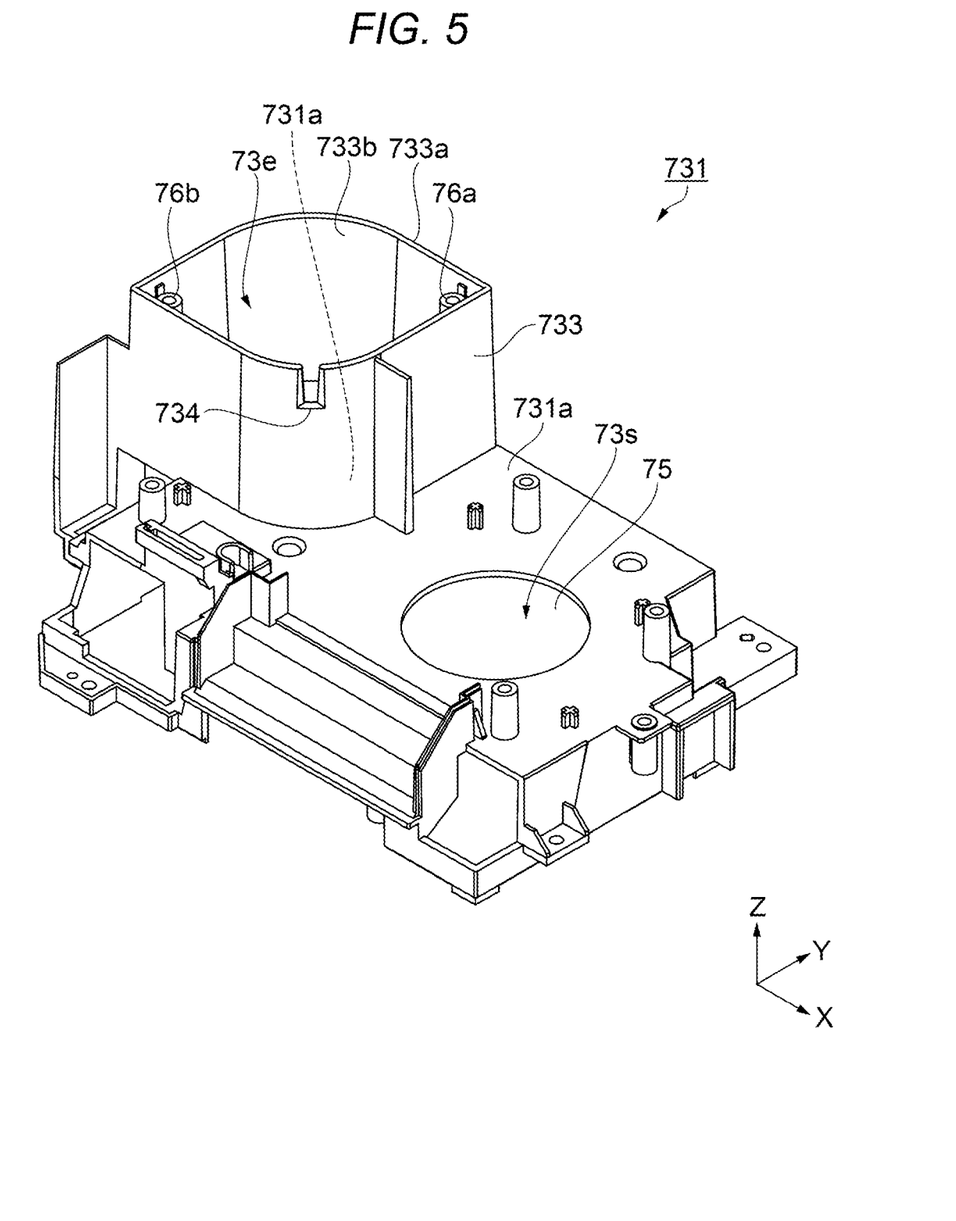
FIG. 5 is a perspective view of an upper holder of a power source housing.
Figure 6:
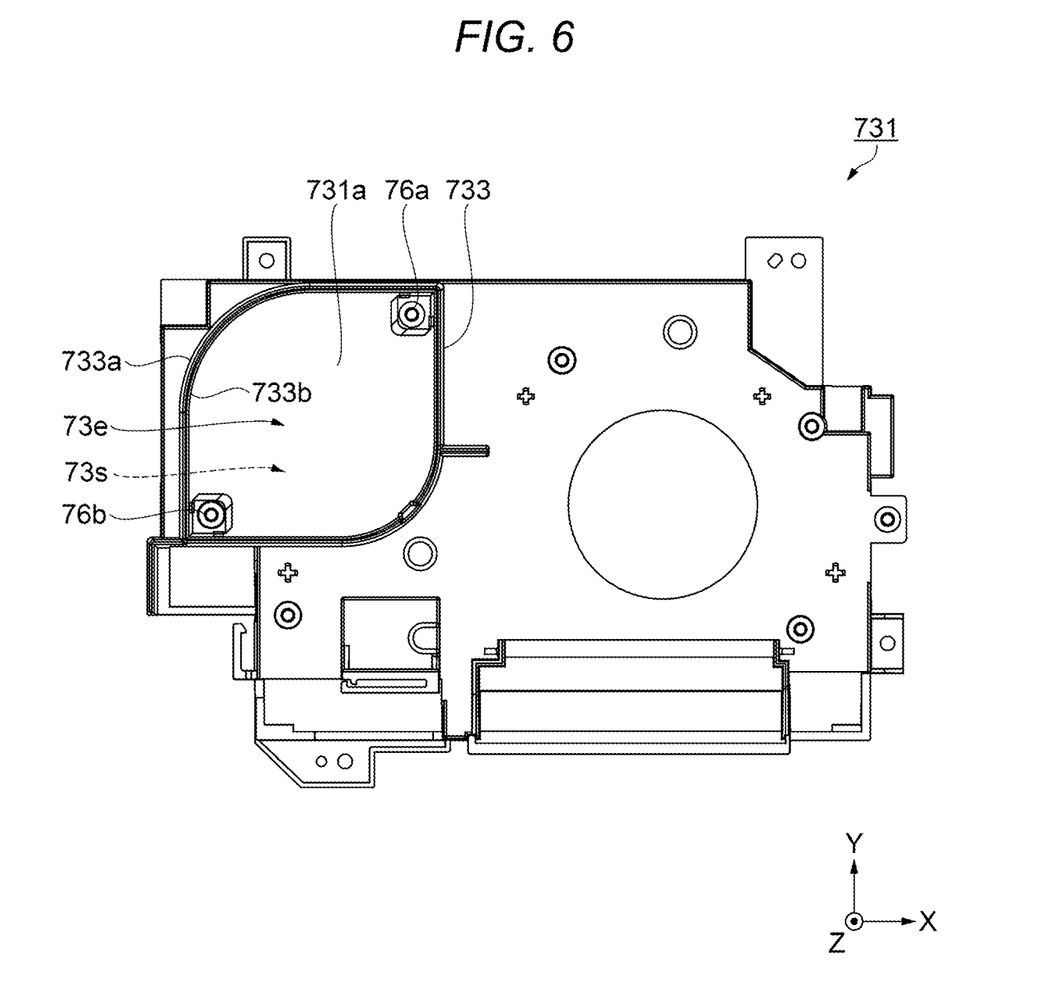
FIG. 6 is a plan view of the upper holder of the power source housing.

FIG. 5 is a perspective view of the upper holder of the power source housing, and FIG. 6 is a plan view of the upper holder of the power source housing.

Pillars 76a and 76b, which have screw holes for fixing the loudspeaker 4 to the wall section 733 in the vicinity of the opening edge 733a, are disposed inside the wall section 733, as shown in FIG. 5.

The wall section 733 is not provided with a hole passing through the wall section 733, except for the cutout 734 provided at the opening edge 733a. The upper surface 731a, which faces the space 73e, is not provided with a hole via which the spaces 73e and 73s communicate with each other, as shown in FIG. 6. The space 73e facing the rear surface of the loudspeaker 4 can therefore be a sealed space, and the wall section 733 functions as a sealing enclosure of the loudspeaker 4. The opposite surface, of the upper holder 731, corresponding to the upper surface 731a facing the space 73e faces the space 73s. That is, the upper holder 731 has one side facing the space 73e and the opposite side facing the space 73s.

The wall section 733 is molded integrally with the upper surface 731a of the upper holder 731 so as to stand from the upper holder 731, as described above. That is, since the wall section 733, which functions as the enclosure of the loudspeaker 4, is integrated with the upper holder 731, which constitutes the power source housing 73, an increase in the number of parts can be suppressed, and an increase in the cost due to the increase in the number of parts can also be suppressed.

Figure 7:
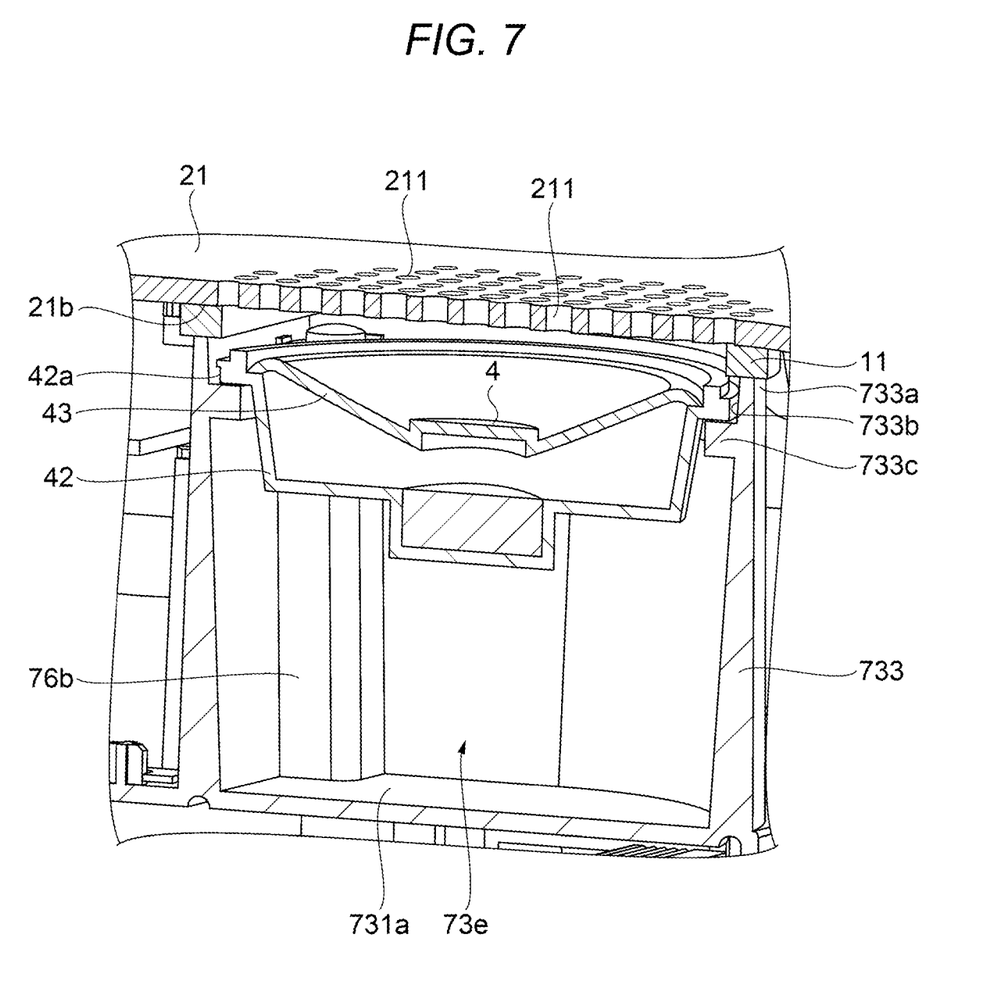
FIG. 7 is a cross-sectional view taken along the line B-B in FIG. 1.

FIG. 7 is a cross-sectional view taken along the line B-B in FIG. 1.

The loudspeaker 4 is housed in the wall section 733 of the power source housing 73, and disposed in the exterior housing 2 at the position where the holes 211 for the loudspeaker are provided.

An elastic member 11 is disposed between the opening edge 733a of the wall section 733 and an inner surface 21b of the upper case 21. The elastic member 11 suppresses leakage of the sound waves from the loudspeaker 4 into the exterior housing 2 via the gap between the wall section 733 and the inner surface 21b of the upper case 21 to suppress chattering noise that affects other components in the exterior housing 2. The elastic member 11 further suppresses occurrence of chattering noise by preventing the vibration of the speaker cone 43 from being transmitted to the wall section 733 via the frame 42 to prevent the portion, of the opening edge 733a, in contact with the upper case 21 from being rubbed against the upper case 21.

Since occurrence of the chattering noise can be suppressed by disposing the elastic member 11 as described above, the projector 1 according to the present embodiment can provide improved tonality. The applicant of the present application was able to ascertain that the projector 1 employing the elastic member 11 in the present embodiment allows improvement in the tonality from 0.9 to 0.95.

An extending section 733c is formed at the inner wall 733b of the wall section 733. The extending section 733c is disposed along the full circumference of the outer edge 42a of the frame 42 of the loudspeaker 4 so as to fill the gap between the outer edge 42a of the frame 42 and the inner wall 733b of the wall section 733.

The degree of the sealed state of the space 73e facing the rear surface of the loudspeaker 4 can be increased by providing the extending section 733c. The pressure of the sound from the loudspeaker 4 can thus be further improved.

Note that the extending section 733c is not an essential component. A configuration other than the extending section 733c can be employed to achieve a desired degree of the sealed state of the space 73e facing the rear surface of the loudspeaker 4. When a desired degree of the sealed state of the space 73e facing the rear surface of the loudspeaker 4 can be achieved by the configuration formed only of the wall section 733, it is not necessary to provide the extending section 733c.

As described above, the projector 1 according to the present embodiment can provide the effects below.

The projector 1 according to the present embodiment includes the exterior housing 2 as the outer housing, the power source housing 73 as the single inner housing housed in the exterior housing 2 and including the wall section 733 as the first container, and the upper holder 731 and the lower holder 732 as the second container that houses functional elements, and the loudspeaker 4 housed in the first container and including the frame 42, and the first container has the wall section 733 extending along the frame 42.

The configuration described above, in which the power source housing 73 is provided with the wall section 733, which functions as the enclosure of the loudspeaker 4, can suppress leakage of the sound waves emitted from the rear side of the loudspeaker 4 toward the front side of the loudspeaker 4. The sound pressure of the sound outputted from the loudspeaker 4 of the projector 1 can therefore be improved.

The wall section 733, which functions as the enclosure of the loudspeaker 4, is integrated with the upper holder 731 of the power source housing 73. Furthermore, the upper holder 731, which faces the space 73e facing the rear surface of the loudspeaker 4, also functions as the second container, which houses the power source circuit substrate 71. No dedicated member for sealing the space 73e facing the rear surface of the loudspeaker 4 is therefore required, whereby increases in the number of parts and cost can be suppressed.

In the projector 1 according to the present embodiment, the exterior hosing 2 has the inner surface 21b, which faces the wall section 733, and the elastic member 11 is provided between the opening edge 733a of the wall section 733 and the inner surface 21b.

The configuration described above can suppress leakage of the sound waves from the loudspeaker 4 into the exterior housing 2 via the gap between the wall section 733 and the exterior housing 2 to suppress chattering noise that affects other components provided in the exterior housing 2.

Furthermore, in the projector 1 according to the present embodiment, the loudspeaker 4 includes the cable 41, which transmits electric signals, the wall section 733 has the cutout 734 at the opening edge 733a, and the cable 41 is drawn out of the wall section 733 via the cutout 734.

The configuration described above allows the cable 41 to be drawn out of the wall section 733 while suppressing sound leakage from the wall section 733.

Furthermore, in the projector 1 according to the present embodiment, the wall section 733 has the space 73e as a sealed space at the side facing the rear surface of the loudspeaker 4.

The configuration described above can effectively suppress leakage of sound waves outputted from the rear side of the loudspeaker 4, which are opposite in terms of phase from the sound waves outputted from the front side of the loudspeaker 4, toward the front side of the loudspeaker 4. The pressure of the sound from the loudspeaker 4 can therefore be improved.

Furthermore, in the projector 1 according to the present embodiment, one of the functional elements is the power source unit 7, and the inner housing is the power source housing 73 as a housing for the power source unit.

The configuration described above, in which the power source unit 7 does not house the optical unit 5, which forms images, can suppress image distortion that occurs in the optical unit 5 due to the sound waves from the loudspeaker 4.

Furthermore, in the projector 1 according to the present embodiment, the wall section 733 is provided between the upper holder 731 and the inner surface 21b of the upper case 21.

The configuration described above, in which the narrow space between the power source housing 73 and the upper case 21 can be used to dispose the wall section 733, can suppress an increase in the size of the exterior housing 2. The thus disposed wall section 733 allows reduction in dead space in the exterior housing 2, whereby the interior space of the exterior housing 2 can be used at improved efficiency.

2. Second Embodiment

2.1. Overview of Projector

A second embodiment will be described with reference to a case where the enclosure has the shape of a duct.

Figure 8:
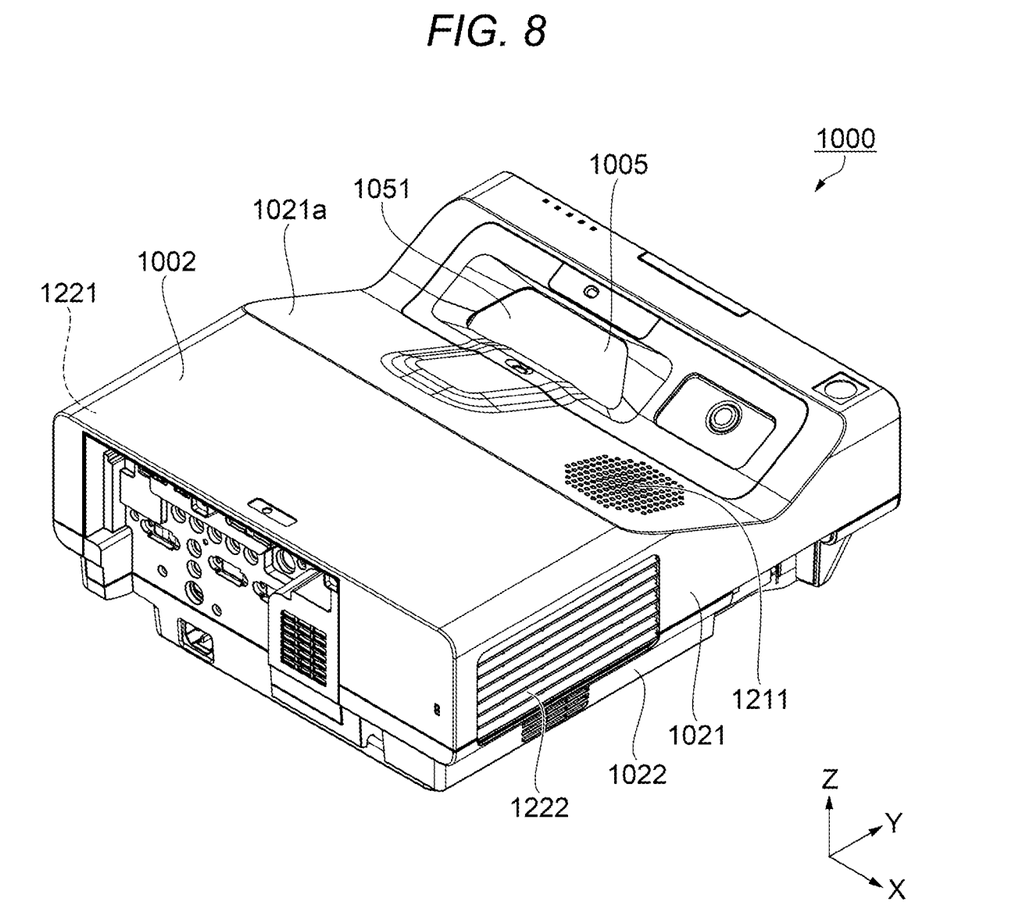
FIG. 8 is a perspective view showing the exterior appearance of the projector r according to a second embodiment.
Figure 9:
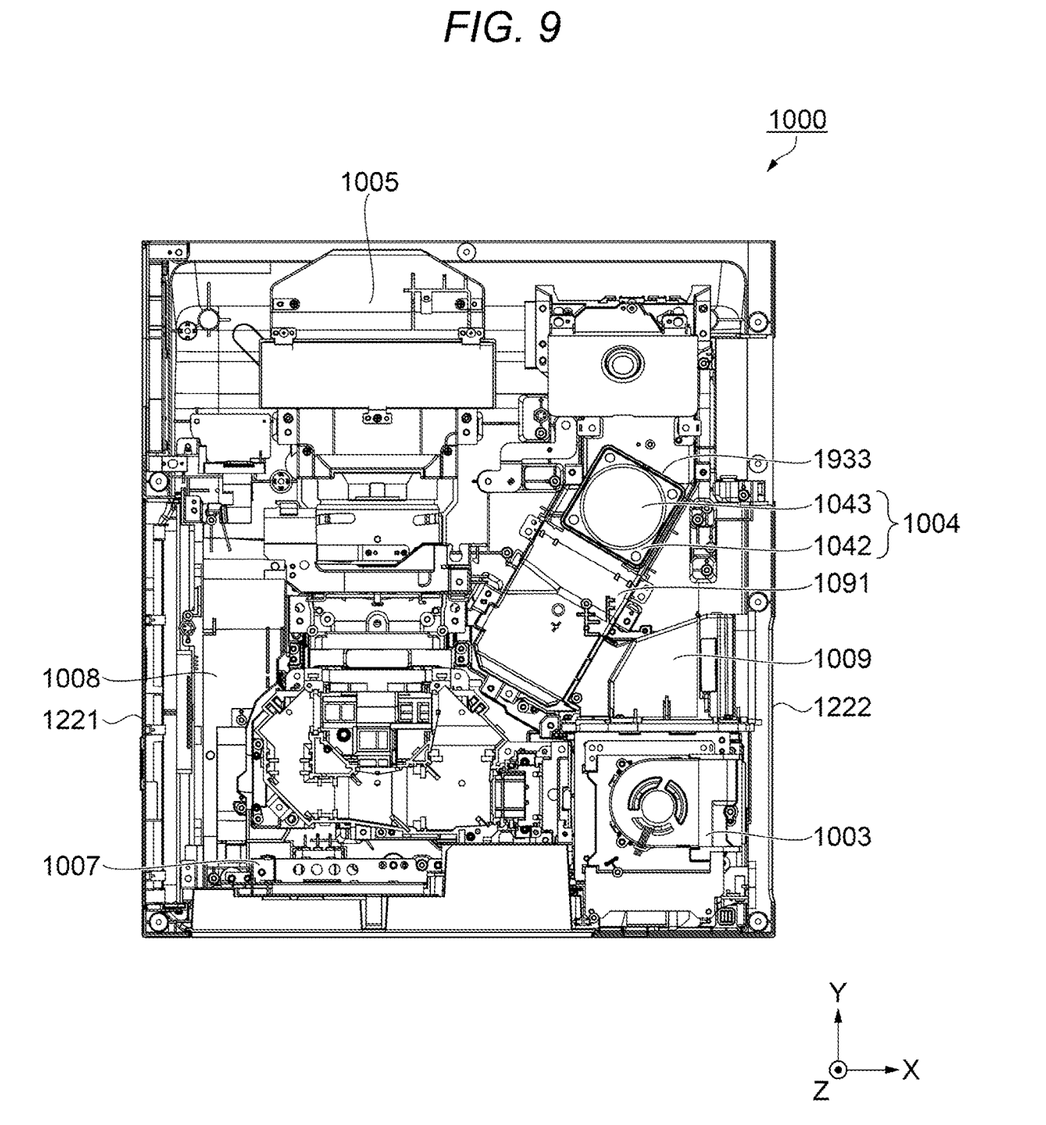
FIG. 9 is a plan view showing the interior of the projector shown in FIG. 8.

FIG. 8 is a perspective view showing the exterior appearance of the projector according to the second embodiment. FIG. 9 is a plan view showing the interior of the projector shown in FIG. 8.

A projector 1000 includes an exterior housing 1002 as the outer housing, a light source unit 1003, a loudspeaker 1004, an optical unit 1005 including a projection window 1051, a power source unit 1007, an intake unit 1008, and an exhaust unit 1009 as a cooler, as shown in FIGS. 8 and 9.

The exterior housing 1002 is made of synthetic resin and includes an upper case 1021, a lower case 1022, and other components, as shown in FIG. 8, which are assembled with screws, and the like.

The upper case 1021 constitutes an upper portion of the exterior housing 1002, as shown in FIG. 8. An upper surface 1021*a* of the upper case 1021 is provided with a plurality of holes 1211 in correspondence with the position where the loudspeaker 1004 is disposed. The upper surface 1021*a* of the upper case 1021 is provided with the projection window 1051, and an image outputted from the optical unit 1005 is projected via the projection window 1051. The image projected via the projection window 1051 is outputted in the direction toward the rear side of the projector 1000, which is the negative side of the axis Y. An intake port 1221, via which outside air is taken in, is provided in the side surface, of the upper case 1021, that faces the negative side of the axis X. An exhaust port 1222 is provided in the side surface, of the exterior housing 1002, that faces the positive side of the axis X.

The lower case 1022 constitutes a lower portion of the exterior housing 1002. A lower portion of the lower case 1022 is provided with legs used when the projector 1000 is installed by a wall, at a ceiling, or at any other location and a fixing portion to be fixed to a ceiling suspension fixture.

The optical unit 1005 is controlled by a controller that is not shown that a luminous flux outputted from the light source unit 1003 is projected via a light modulator that is not shown. The light modulator is formed of three-panel liquid crystal light valves. Note that the light modulator may instead be DMDs or a single-plate light modulator, as in the first embodiment.

The loudspeaker 1004 is attached to a wall section 1933 in the vicinity of an opening edge 1933*a* thereof, as shown in FIG. 9. The loudspeaker 1004 includes a speaker cone 1043 and a frame 1042, which supports the speaker cone 1043 in such a way that the speaker cone 1043 can vibrate. In the present embodiment, the loudspeaker 1004 is housed in the wall section 1933 provided as part of a duct 1091 of the exhaust unit 1009. The frame 1042 of the loudspeaker 1004 has a substantially quadrangular shape in the plan view, and the wall section 1933 also has the same quadrangular shape as that of the frame 1042.

2.2. Overview of Duct

The configuration of the duct used in the exhaust unit 1009 as the cooler will next be described.

Figure 10:
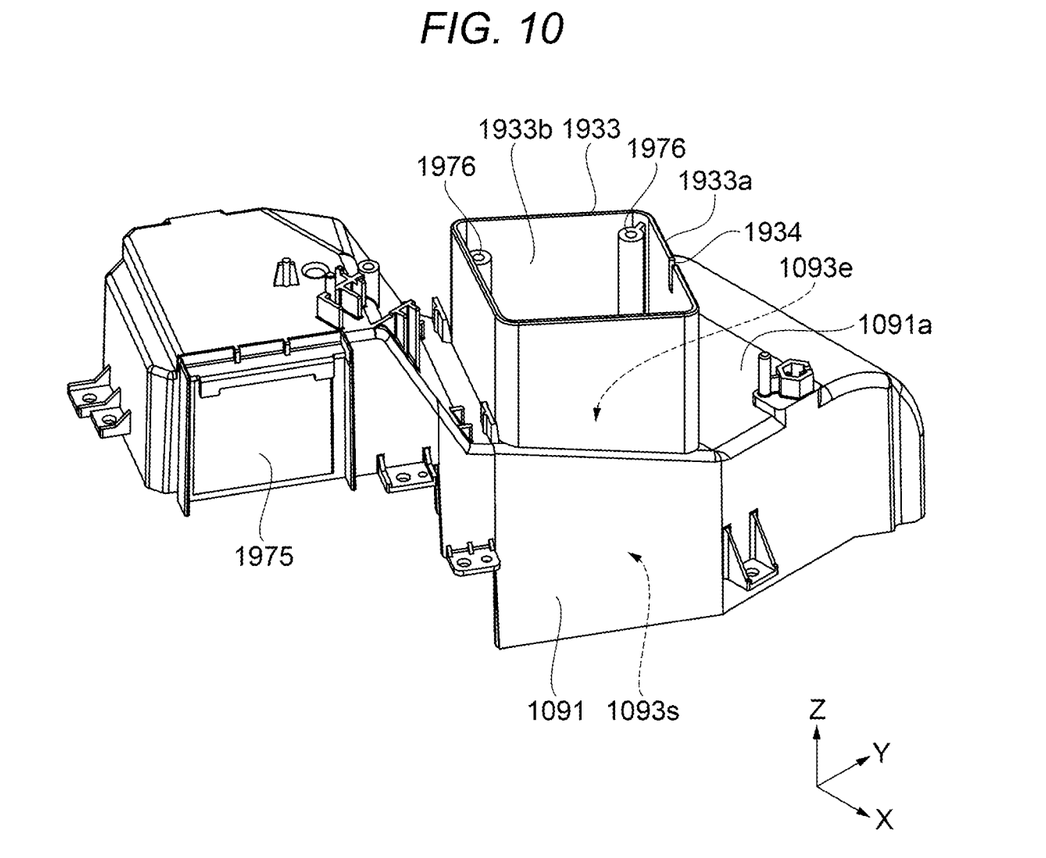
FIG. 10 is a perspective view of a duct.
Figure 11:
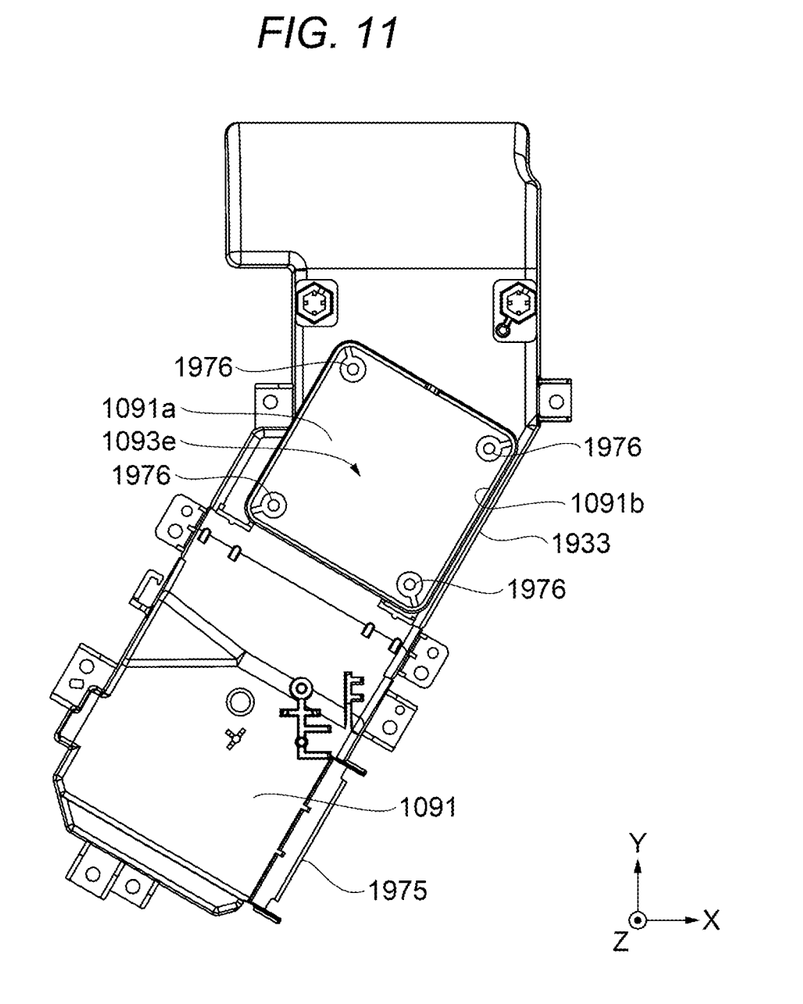
FIG. 11 is a plan view of the duct.

FIG. 10 is a perspective view showing the duct, and FIG. 11 is a plan view of the duct.

The duct 1091 as a refrigerant passage channel has a tubular structure and allows a refrigerant that serves as a functional element to flow, as shown in FIG. 10. In the present embodiment, the refrigerant is air used for cooling. The refrigerant passing through the duct 1091 is discharged out of the exterior housing 2 via an air discharge port 1975 and the exhaust port 1222.

The duct 1091 has the wall section 1933 as the first container. The duct 1091 is a molded part made of a resin material, and the wall section 1933 is molded integrally with an upper surface 1091*a* of the duct 1091 to form part of the duct 1091.

A pillar 1976, which fastens the loudspeaker 1004 with a screw in the vicinity of the opening edge 1933*a* of the wall section 1933, is provided at each inside corner of the wall section 1933. The opening edge 1933*a* of the wall section 1933 is provided with a cutout 1934. A cable that is not shown is caused to pass through the cutout 1934, and an acousto-electric signal is transmitted through the cable to the loudspeaker 1004, as in the first embodiment.

The wall section 1933 is so formed that an inner wall 1933*b* thereof has a shape extending along the outer edge of the frame 1042 of the loudspeaker 1004 to surround the loudspeaker 1004. Disposing the loudspeaker 1004 in the vicinity of the opening edge 1933*a* of the wall section 1933 therefore allows the loudspeaker 1004 to close the opening edge 1933*a* of the wall section 1933, so that a space 1093*e* facing the rear surface of the loudspeaker 1004 is a sealed space.

Creating the space 1093*e* facing the rear surface of the loudspeaker 1004 as a sealed space can isolate the sound waves from the front side of the loudspeaker 1004 and the sound waves from the rear side of the loudspeaker 1004 from each other, and can therefore suppress the situation in which low-frequency sound from the front side and low-frequency sound from the rear side, which are opposite from each other in terms of phase, cancel each other out. The pressure of the sound from the loudspeaker 1004 can thus be improved.

The space 1093*e* facing the rear surface of the loudspeaker 1004 does not need to be a completely sealed space, as in the first embodiment.

The wall section 1933 is not provided with a hole passing through the wall section 1933, except for the cutout 1934 provided at the opening edge 1933*a*, as shown in FIG. 9. The upper surface 1091*a*, which faces the space 1093*e*, is not provided with a hole via which the spaces 1093*e* and 1093*s* communicate with each other, as shown in FIG. 10. The wall section 1933 and the upper surface 1091*a* of the duct 1091 can therefore form the sealed space 1093*e* facing the rear surface of the loudspeaker 1004. That is, the wall section 1933 provided as part of the duct 1091 is allowed to function as a sealing enclosure of the loudspeaker 1004. The opposite surface, of the duct 1091, corresponding to the upper surface 1091*a* facing the space 1093*e* faces the space 1093*s* in the duct. That is, the duct 1091 has one side facing the space 1093*e* and the opposite side facing the space 1093*s*.

The wall section 1933 is molded integrally with the duct 1091 so as to stand from the upper surface 1091*a* of the duct 1091, as described above. That is, since the wall section 1933, which functions as the enclosure of the loudspeaker 1004, is integrated with the duct 1091, an increase in the number of parts can be suppressed, and an increase in the cost due to the increase in the number of parts can also be suppressed.

The loudspeaker 1004 is housed in the wall section 1933 of the duct 1091 and disposed in the exterior housing 1002 at the position where the holes 1211 for the loudspeaker are provided, as shown in FIGS. 9 and 10.

Although not shown, an elastic member is disposed between the opening edge 1933*a* of the wall section 1933 and the inner surface of the upper case 1021, as in the first embodiment. Disposing the elastic member as described above improves the tonality, as in the first embodiment.

An extending section may be formed at the inner wall 1933*b* of the wall section 1933, as in the first embodiment.

Providing the extending section allows an increase in the degree of the sealed state of the space 1093e facing the rear surface of the loudspeaker 1004, whereby the pressure of the sound from the loudspeaker 1004 can be further improved, as in the first embodiment.

In the present embodiment, the wall section 1933 is formed as part of the duct 1091 used in the exhaust unit 1009. Instead, the wall section 1933 may be provided as part of a duct used in the intake unit 1008 to function as the enclosure of the loudspeaker 1004. The wall section 1933 may still instead be provided as part of another duct disposed in the exterior housing 1002.

As described above, the projector 1000 according to the present embodiment can provide the effects below in addition to the effects provided by the first embodiment.

The projector 1000 according to the present embodiment includes the exterior housing 1002 as the outer housing, the exhaust unit 1009 as the cooler, which is housed in the exterior housing 1002 and includes the wall section 1933 serving as the first container and the duct 1091 as the refrigerant passage channel through which the refrigerant flows, and the loudspeaker 1004, which is housed in the wall section 1933 and includes the frame 1042, and the first container has the wall section 1933 extending along the frame 1042.

The configuration described above, in which the duct 1091 is provided with the wall section 1933, which functions as the enclosure of the loudspeaker 1004, can suppress leakage of the sound waves emitted from the rear side of the loudspeaker 1004 to the front side of the loudspeaker 1004, whereby the sound pressure can be improved.

Since the wall section 1933, which functions as the enclosure of the loudspeaker 1004, is integrated with the duct 1091, no dedicated component is required to seal the space 1093e facing the rear surface of the loudspeaker 1004, whereby increases in the number of parts and the cost can be suppressed.

Since the duct 1091 does not house the optical unit 1005, which forms images, image distortion that occurs in the optical unit 1005 due to the sound waves from the loudspeaker 1004 can be suppressed.

What is claimed is:

1. A projector comprising:
   an outer housing;
   a single inner housing housed in the outer housing and including a first container and a second container, the second container housing a functional element; and
   a loudspeaker housed in the first container and including a frame,
   wherein the first container has a wall section extending along the frame.

2. The projector according to claim 1,
   wherein the outer housing has an inner surface that faces the first container, and
   an elastic member is provided between an opening edge of the wall section of the first container and the inner surface.

3. The projector according to claim 2,
   wherein the loudspeaker includes a cable that transmits an electric signal,
   the wall section has a cutout at the opening edge, and
   the cable is drawn out of the first container via the cutout.

4. The projector according to claim 1,
   wherein the first container has a sealed space at a side facing a rear surface of the loudspeaker.

5. The projector according to claim 1,
   wherein the functional element is a power source unit, and the inner housing is a housing for the power source unit.

6. The projector according to claim 5,
   wherein the first container is provided between the second container and the outer housing.

7. A projector comprising:
   an outer housing;
   a cooler housed in the outer housing and including a first container and a refrigerant passage channel through which a refrigerant flows; and
   a loudspeaker housed in the first container and including a frame,
   wherein the first container has a wall section extending along the frame.

8. The projector according to claim 7,
   wherein the outer housing has an inner surface that faces the first container, and
   an elastic member is provided between an opening edge of the wall section of the first container and the inner surface.

9. The projector according to claim 8,
   wherein the loudspeaker includes a cable that transmits an electric signal,
   the wall section has a cutout at the opening edge, and
   the cable is drawn out of the first container via the cutout.

10. The projector according to claim 7,
    wherein the first container has a sealed space at a side facing a rear surface of the loudspeaker.

* * * * *